United States Patent [19]
Takagi

[11] Patent Number: 5,254,200
[45] Date of Patent: Oct. 19, 1993

[54] METHOD AND APPARATUS FOR PEELING A RELEASABLE SHEET FROM AN ADHESIVE LABEL

[75] Inventor: Yukihito Takagi, Kasugai, Japan

[73] Assignee: Brother Kogyo Kabushiki Kaisha, Nagoya, Japan

[21] Appl. No.: 829,321

[22] Filed: Feb. 3, 1992

[30] Foreign Application Priority Data

Mar. 12, 1991 [JP] Japan .................. 3-46492

[51] Int. Cl.⁵ .................................... B32B 35/00
[52] U.S. Cl. ........................... 156/344; 156/249; 156/584
[58] Field of Search .................. 156/249, 344, 584

[56] References Cited

U.S. PATENT DOCUMENTS

| | | | |
|---|---|---|---|
| 3,028,280 | 4/1962 | Hoffman | 156/344 X |
| 3,310,145 | 3/1967 | Pedersen . | |
| 4,177,104 | 12/1979 | Parker | 156/344 X |
| 4,927,278 | 5/1990 | Kuzuya et al. . | |
| 5,141,584 | 8/1992 | Schuh et al. | 156/344 |
| 5,169,474 | 12/1992 | Binder | 156/344 |
| 5,169,476 | 12/1992 | Silveira et al. | 156/344 |

Primary Examiner—David A. Simmons
Assistant Examiner—Mark A. Osele
Attorney, Agent, or Firm—Oliff & Berridge

[57] ABSTRACT

After an operator places a label made in a recording device into a slot of, for example, a lettering pen, the operator rotates the lettering pen so as to bend the label causing an image receiving tape portion of the label to face itself, with the lettering pen therebetween. The operator then grasps one end of the label and moves the lettering pen away from the grasped end so as to remove the label from the slot of the lettering pen. This causes a portion of a releasable sheet portion of the label to be separated from the image receiving tape portion of the label. Instead of rotating the lettering pen, the label can be bent around two members forming a slot. A kit including the slotted pen and a tape printer can also be provided, or a slot-defining element can be mounted on a main body of the tape printer.

18 Claims, 8 Drawing Sheets

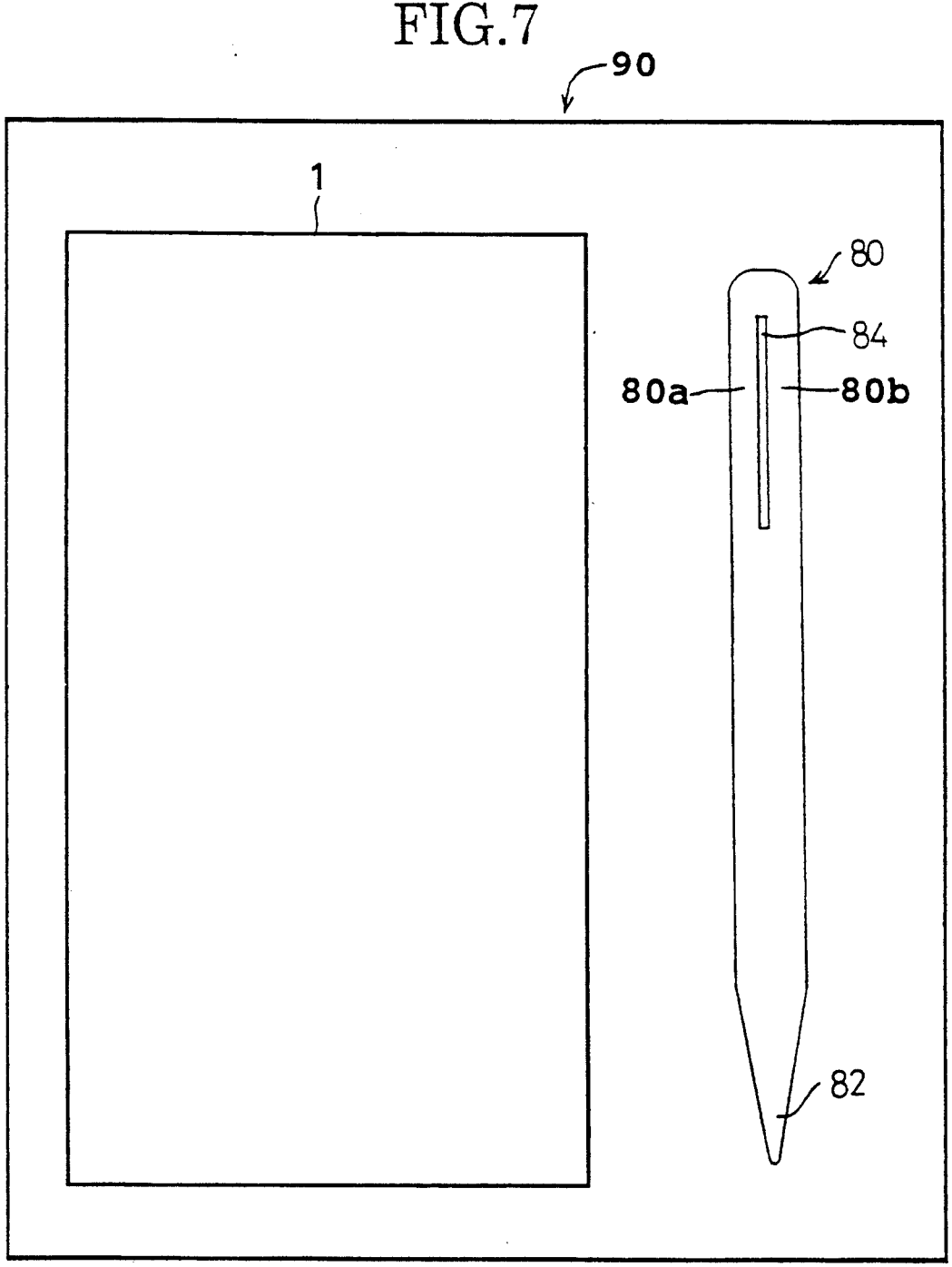

METHOD AND APPARATUS FOR PEELING A RELEASABLE SHEET FROM AN ADHESIVE LABEL

BACKGROUND OF THE INVENTION

1. Field of the Invention

The present invention relates to method and apparatus for peeling a releasable sheet from an adhesive layer of a tape (or label tape) which is comprised of a tape base having the adhesive layer and the releasable sheet removably adhered to the adhesive layer.

2. Description of Related Art

A tape printing device for making a printed adhesive tape (also known as a label tape) having a releasable sheet removably adhered to the adhesive layer of the label tape is well-known. The label tape includes an image receiving tape upon which characters are printed, an adhesive layer on a back side of the image receiving tape, and a releasable sheet removably adhered to the adhesive layer. The image receiving tape and adhesive layer together define a tape base. The tape printing device outputs the label tape including the releasable sheet by printing desired characters and symbols on the tape base of the label tape using, for example, an impact printing head, an embossing printing head, or a thermal printing head. The tape printing device also cuts the label tape into a predetermined length. In order to adhere a label made by the tape printing device to a label receiving member, the releasable sheet is removed from the adhesive layer by peeling so as to directly expose the adhesive layer, which is then adhered to the label receiving member. For an example of a tape printing device which uses a thermal printing head to form the above-described label tapes, see U.S. Pat. No. 4,927,278 to Kuzuya et al, the disclosure of which is incorporated herein by reference.

When an operator peels the releasable sheet from the tape base of the label, the operator folds down one end of the label in order to form a space between the adhesive layer and the releasable sheet. The operator then inserts an object such as a claw into the space in order to peel the releasable sheet from the adhesive layer.

When the releasable sheet is removed by the above-described method, the tape base is folded. Folding the tape base causes problems in that it is difficult to adhere the folded portion of the label to the label receiving member, or the label is easily removed from the label receiving member (since the folded portion may not adhere well to the label receiving member).

U.S. Pat. No. 3,310,145 discloses a hand-operated tape embossing tool having a tape cutting device comprising a cutting blade for cutting entirely through the tape, and a slitting blade for cutting only the tape base including the adhesive layer (i.e., a releasable backing layer is not cut by the slitting blade). Thus, the tape cutting device is a compound cutting device which can cut entirely through the tape and form a half cut portion on the tape at the same time.

When the operator peels the releasable backing layer from the tape base, the operator folds the tape at the half cut portion. Then, the tape base including the adhesive layer is peeled from the releasable backing layer at the half cut portion.

However, with the above-described type of tape cutting device, a space must be provided between the slitting blade and an anvil which confronts the slitting blade. The space is provided so that the slitting blade only cuts through the tape base including the adhesive layer without cutting through the releasable backing sheet. Therefore, a special construction for adjusting the space is required, and the point where the slitting blade confronts the anvil must be determined exactly. Accordingly, the construction for supporting the slitting blade is complicated, and the cutting device is costly to produce. Additionally, installation of the slitting blade in the tape cutting device can be complicated.

SUMMARY OF THE INVENTION

It is therefore an object of the present invention to provide method and apparatus for easily peeling a releasable sheet from an adhesive layer without a device for performing a half cut.

To achieve the foregoing and other objects, and to overcome the shortcomings discussed above, the present invention provides a method of peeling a releasable sheet of a label tape from a printed tape base having an adhesive layer, including the steps of:

(a) inserting a label into an opening formed by first and second members spaced from each other by a distance greater than a thickness of the label so that the first member is adjacent to the tape base, and the second member is adjacent to the releasable sheet;

(b) bending the label so that the tape base confronts itself by rotating the second member about the first member;

(c) moving one end of the label relative to the first and second members until the label is removed from the opening between the first and second members so as to separate a portion of the releasable sheet from the tape base; and (d) peeling the releasable sheet from the adhesive layer.

In one embodiment, the label is bent near its center so that one end of the label confronts an opposite end of the label.

According to the method of the present invention comprising the above-mentioned steps, an operator inserts a label into the opening formed by the first and second members, and rotates the member adjacent to the releasable sheet about the member adjacent to the tape base so that the label bends into a "U-shape". After the operator secures one end of the label (for example, by grasping that end), the operator moves the first and second members away from the secured end of the label. Alternatively, the operator could move one end of the label away from the members after the operator secures the members. As another alternative, the operator could move one end of the label and the members away from each other. In any case, the label and/or members are moved apart until the label is pulled out from the opening, so that a portion of the releasable sheet is peeled from the adhesive layer.

Instead of rotating the second member about the first member in order to bend the label, the label could be bent around the first member so that the tape base confronts itself. According to this second embodiment of the present invention, first the label is inserted between first and second members so that the first member is adjacent to the tape base, and the second member is adjacent to the releasable sheet. Then, the label is bent around the first member so that the tape base confronts itself with first and second opposite end portions of the label pointing in a same direction so that the first label end portion extends from between the first and second members, and the second label end portion extends only adjacent to the first member. This can be accomplished by, for example, grasping the second label end portion, and bending the label back on itself so that the tape base confronts itself, with the first member being located between the first and second end portions of the label. Once the label is so bent, the second label end is moved relative to the first and second members until the label is removed from between the first and second members so that a space forms between a portion of the releasable sheet adjacent to the first label end portion and the adhesive layer.

The present invention also comprises a tape printer including the first and second members used to perform the above-described method. For example, in one preferred embodiment, the first and second members are defined by opposite sides of a slot which is formed in a lettering pen, typically included with tape printers. In this embodiment, the present invention includes a kit having the tape printer and a slotted lettering pen. Preferably, the tape printer and slotted lettering pen are provided in a common package. In another embodiment of the invention, a slot-defining element can be provided on the main body of the tape printer. The method of the present invention would then be performed by inserting a label through the slot of the slot-defining element, and first and second members of the slot-defining element could then be used in the manner described above.

According to the present invention, even if a tape cutting device for performing a half cut is not provided, the operator can easily peel the releasable sheet from the adhesive layer without folding the tape base or otherwise damaging the tape base.

BRIEF DESCRIPTION OF THE DRAWINGS

Preferred embodiments of the present invention will be described in detail with reference to the following figures wherein:

FIG. 7 is a plan view of a package containing a tape printer and a slotted lettering pen.

DETAILED DESCRIPTION OF THE PREFERRED EMBODIMENTS

Figure 3:
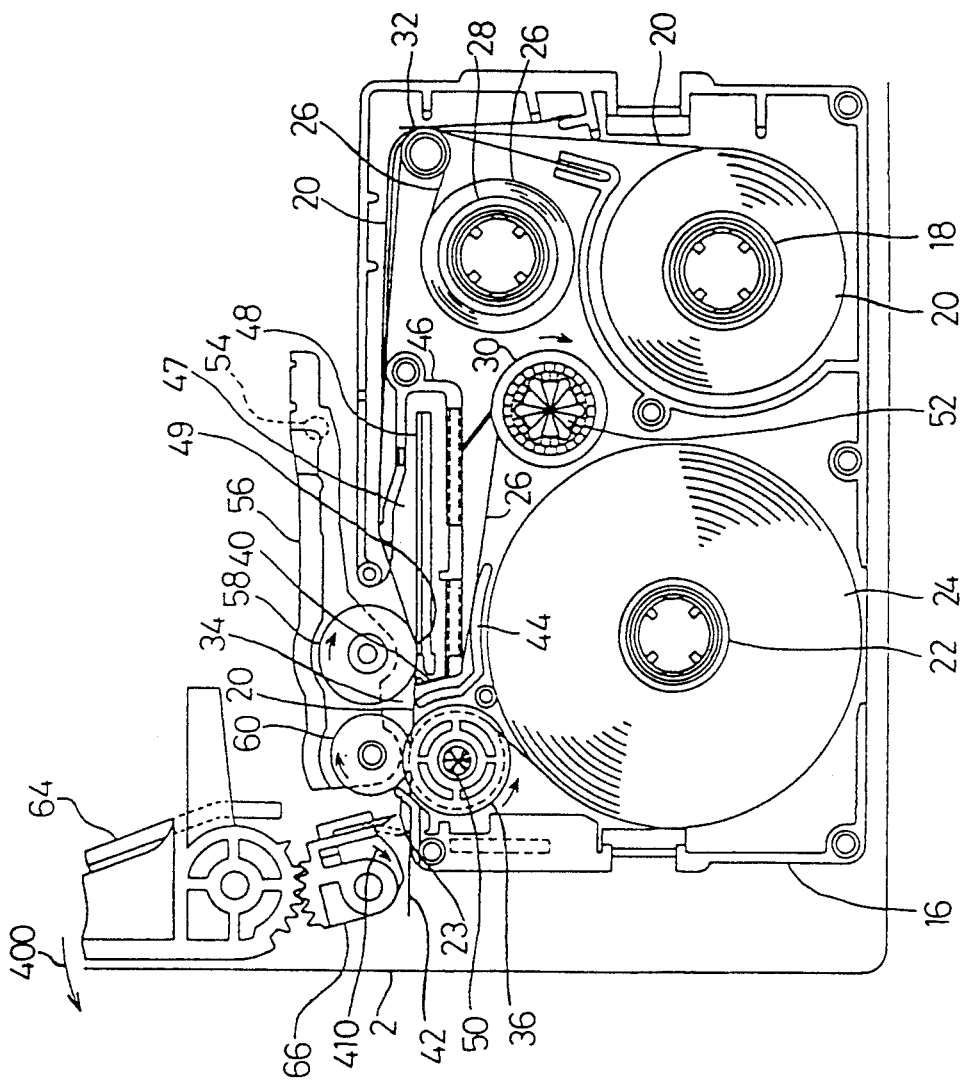
FIG. 3 is a sectional view showing an internal arrangement of the recording device in which a ribbon cassette for forming label tapes is installed.
Figure 4:
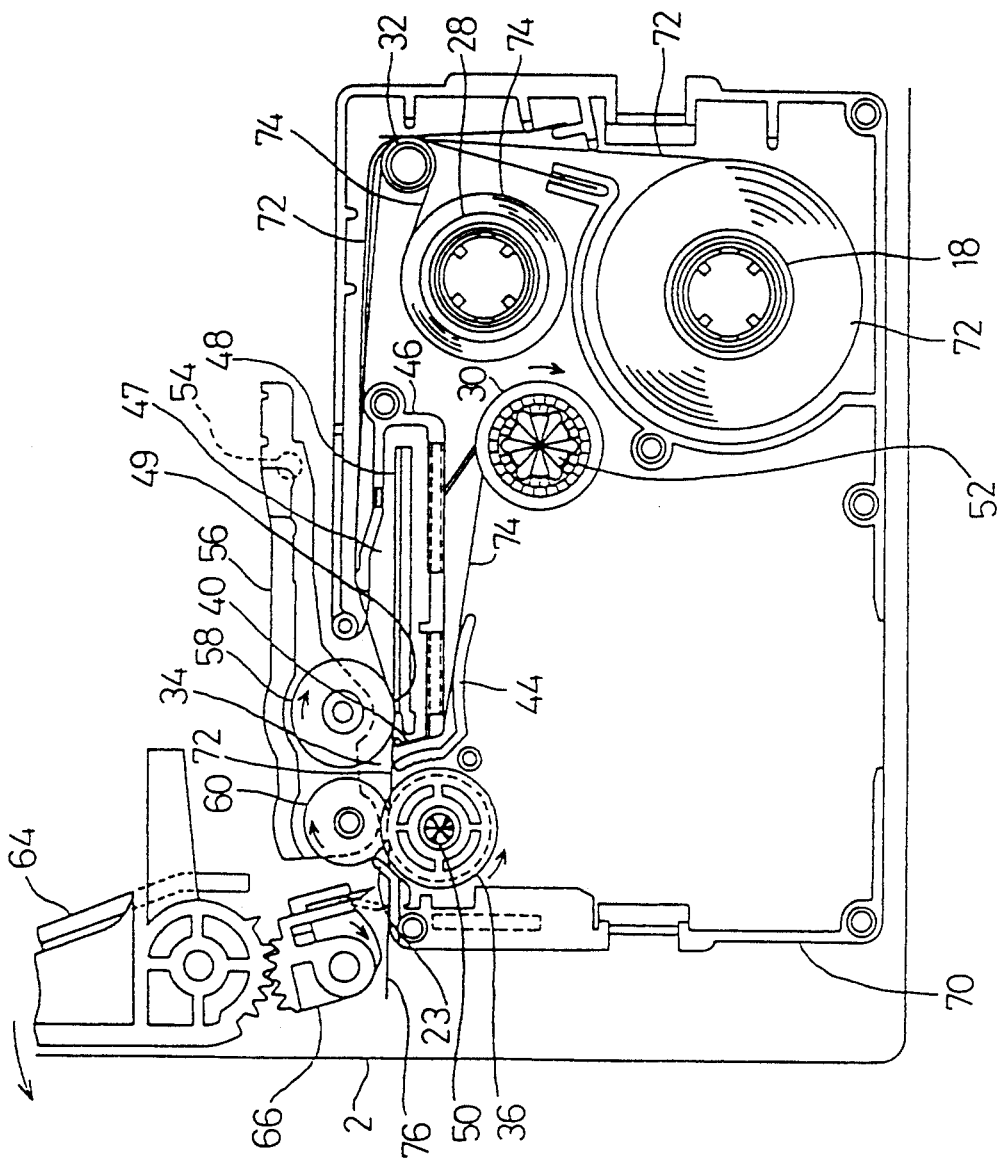
FIG. 4 is a sectional view showing an internal arrangement of the recording device in which a ribbon cassette for forming lettering transfer tape is installed.
Figure 5A:
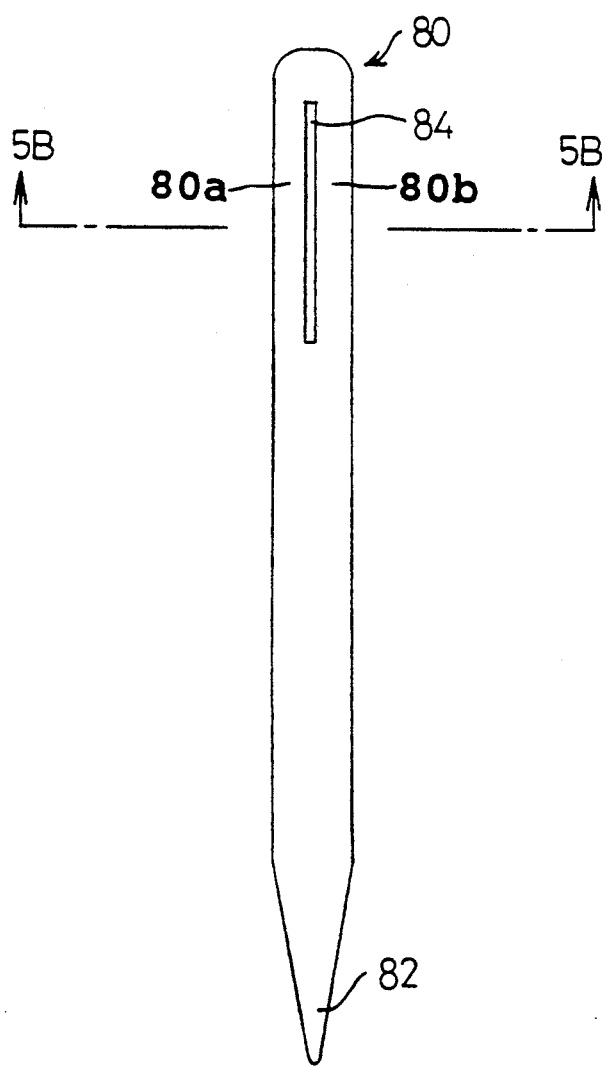
FIG. 5A is a plan view of a lettering pen having a slit between two members for use in the method of the present invention.
Figure 5B:
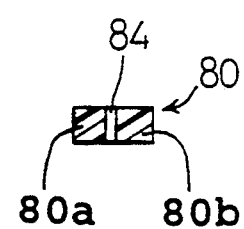
FIG. 5B is a cross-sectional view of the lettering pen along line 5B—5B of FIG. 5A.

Hereinafter, an embodiment of the present invention will be explained with reference to FIGS. 1-6D. Upon reading the present disclosure, or the above-incorporated U.S. Pat. No. 4,927,278, one will understand that tape printing devices can output different types of printed tapes depending on the type of ribbon cassette used with the tape printing device. For example, when a ribbon cassette as described below with respect to FIG. 3 is used, a label tape 42 is output which includes a base tape comprising an image receiving tape having printed characters thereon and an adhesive layer, with the adhesive layer of the base tape being covered by a releasable sheet. When a different type of ribbon cassette such as the ribbon cassette illustrated in FIG. 4 is used, the tape printing device outputs lettering transfer tape which includes an image receiving tape (lettering printing tape) having printed characters thereon, but no adhesive layer (and thus no releasable sheet). The lettering transfer tape can be placed against an image receiving surface and rubbed with, for example, a lettering pen to transfer the printed characters from the image receiving tape to the image receiving surface.

The present invention is concerned with the removal of a releasable sheet from a label tape, and thus is not applicable to the lettering transfer tape. However, since, for example, a modified lettering pen can be used to perform the releasable sheet removal method of the present invention, the lettering tape ribbon cassette mode of operation of the printing device is also briefly described. It will be understood, however, that the method of the present invention can be used with tape printing devices other than the one illustrated in the drawings.

Figure 1:
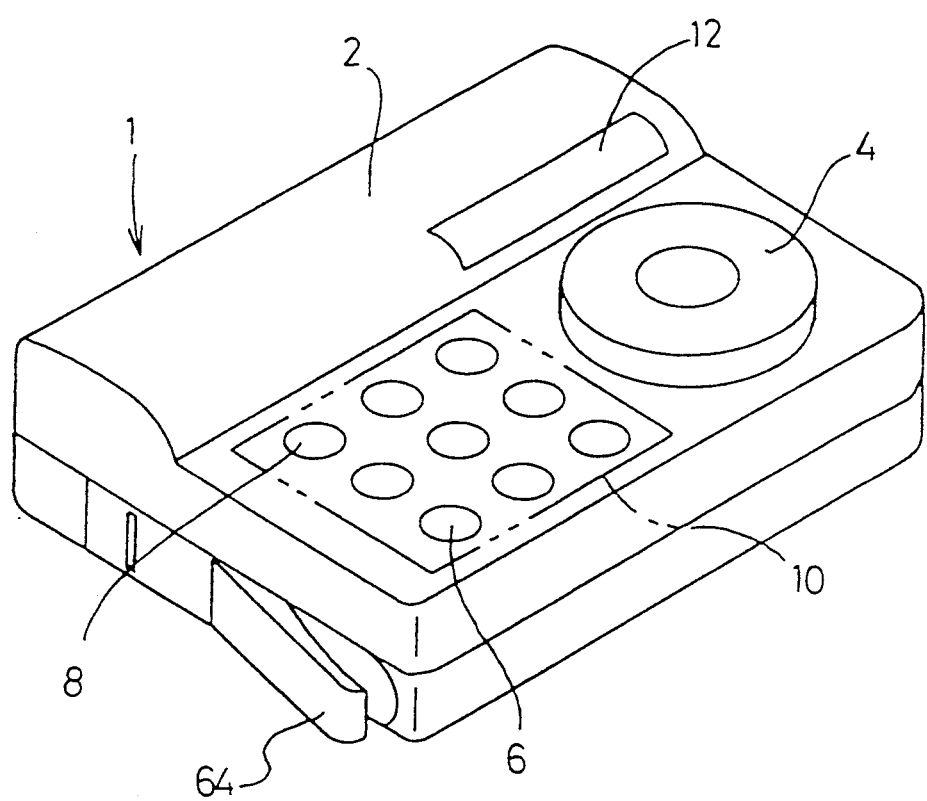
FIG. 1 is a schematic perspective view of a recording device (tape printer)

FIG. 1 is a schematic perspective view of a recording device 1 which prints letters, numbers, and symbols (generically referred to as characters) on an image receiving tape, which can be used in the present invention. A rotary dial 4 for inputting characters is provided on main body 2 of the recording device 1. A group of function keys 10 for providing various control commands to the recording device 1, and a liquid crystal display (LCD) 12 for displaying the inputted characters are provided adjacent to the dial 4. The group of function keys 10 includes, for example, a power supply switch 6 and a print key 8.

Figure 2:
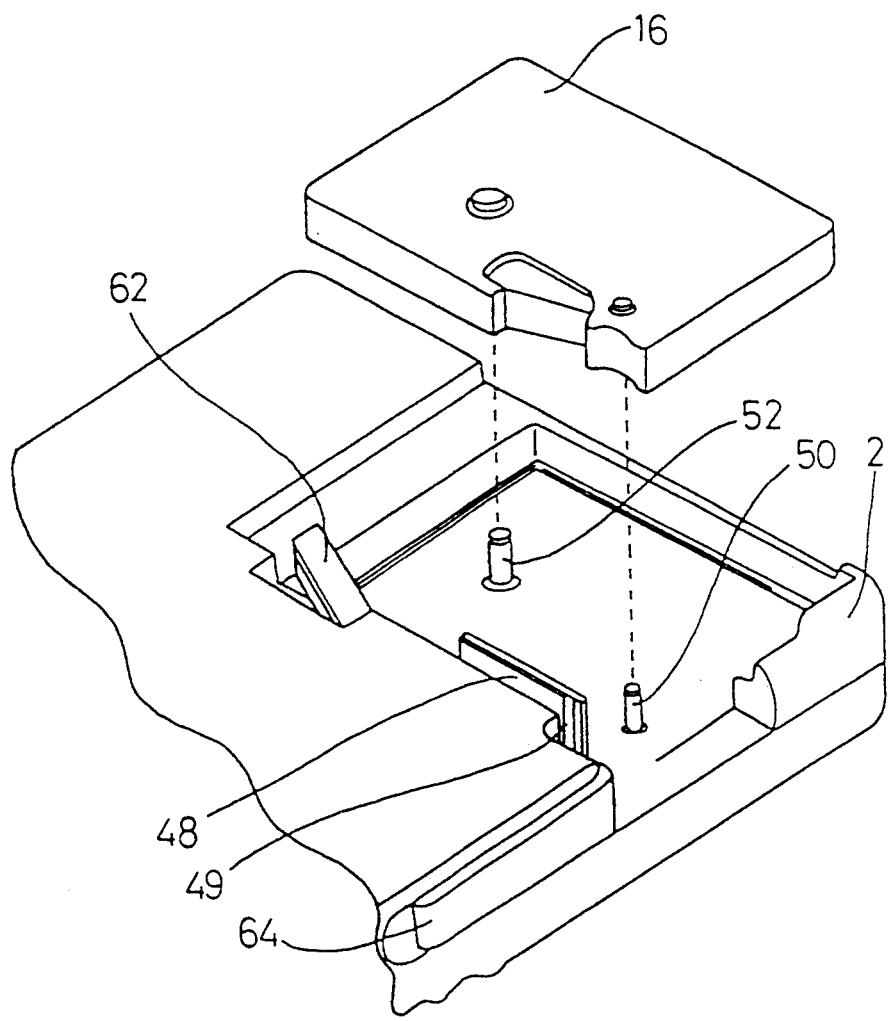
FIG. 2 is a schematic perspective view of a ribbon cassette installation section for the FIG. 1 recording device.

As shown in FIG. 2, a ribbon cassette 16 can be installed detachably in the underside of the main body 2. FIG. 3 shows an internal arrangement of the main body 2 in which the ribbon cassette 16 is installed.

As shown in FIG. 3, a printing tape spool 18 and a dual sided adhesive tape spool 22 are arranged rotatably in ribbon cassette 16. An image receiving tape 20 is wound on the printing tape spool 18. A dual sided adhesive tape 24 having a releasable sheet 25 (see FIGS. 6A-6D) on one side is wound on the dual sided adhesive tape spool 22 such that the releasable sheet 25 faces outwardly. An ink ribbon 26 comprising a base film coated with heat melting ink is wound on an ink ribbon supplying spool 28 such that the ink side faces inwardly. Thus, the ink side of ribbon 26 contacts image receiving tape 20 before the ink ribbon 26 is recorded by a thermal head 48 (to be described later). After the ink ribbon 26 is recorded by the thermal head 48, the ink ribbon 26 is wound up on an ink ribbon winding spool 30.

The image receiving tape 20 is fed from the printing tape spool 18 into a roller entrance 34 around a guide pin 32, and further is passed through a slit in tape retainer 23 from a tape feeding roller 36 so as to be discharged out of the printing device 1. In one embodiment, the image receiving tape 20 is made of a PET (polyethylterephalate) film having a thickness of about 0.05 mm.

The ink ribbon 26 passes between the image receiving tape 20 and the guide pin 32 from the ink ribbon supplying spool 28 and moves toward the roller entrance 34 while being closely held against the image receiving tape 20. After printhead 48 uses ribbon 26 to print characters on image receiving tape 20, the ink ribbon 26 is fed in the opposite direction through a peeling plate 40. In other words, the ink ribbon 26 changes its feeding direction by about 180 degrees in order to be fed toward the ribbon winding spool 30. The peeling plate 40 is located a predetermined interval downstream of the heat-generating elements 49 of the thermal head 48 relative to the direction of the movement of the ink ribbon 26. The peeling plate 40 is used to remove the ink ribbon 26 from the image receiving tape 20.

The dual sided adhesive tape 24 moves toward the tape feeding roller 36 from the dual sided adhesive tape spool 22 and forms a label tape 42 by adhering to the printed image receiving tape 20. After dual sided adhesive tape 24 is adhered to image receiving tape 20, the label tape 42 is discharged from the printing device 1. The thickness of the releasable sheet 25 of the dual sided adhesive tape 24 is about 0.07 mm, its adhesion is 700 gf / 20 mm. The image receiving tape 20 and the dual sided adhesive tape 24 (without the releasable sheet 25) together define a tape base. The tape base combined with the releasable sheet 25 form a label tape 42 (or label). Thus, a tape-type substrate including printed characters and an adhesive surface corresponds to a tape base of the present invention, while such a tape base combined with a releasable sheet over the adhesive layer is referred to as a label. The tape base alone is also sometimes referred to as a label after the releasable sheet is removed from the adhesive layer of the tape base.

A separation wall 44 is provided adjacent to roller entrance 44 between the ink ribbon 26 and the dual sided adhesive tape 24 to prevent the ink ribbon 26 from being drawn out of the printing device 1 along with the dual sided adhesive tape 24. Since the ink ribbon 26 curves easily, there is the possibility that the ink ribbon 26 may adhere to the adhesive side of the dual sided adhesive tape 24 if separation wall 44 was not provided.

A thermal head inserting hole 47 opens inside of the roller entrance 34. The thermal head inserting hole 47 is surrounded by ink ribbon 26 and a surrounding wall 46. The thermal head 48 extends through the thermal head inserting hole 47 in the main body 2. The thermal head 48 includes heat-generating elements 49 which are disposed in a line perpendicular to the feed direction of the ink ribbon 26 on the tip of thermal head 48.

A tape feeding shaft 50 and a ribbon winding spool driving shaft 52 are provided in the main body 2, and are driven by a pulse motor provided in the main body 2. The tape feeding shaft 50 inserts into the tape feeding roller 36 and the ribbon winding spool driving shaft 52 inserts into the ribbon winding spool 30 when the ribbon cassette 16 is installed in the main body 2.

A movable platen roller 58 and a driven feed roller 60 are supported rotatably under a roller holder 56 which is supported swingingly on a swinging shaft 54 fixed in the main body 2. The movable platen roller 58 and the driven feed roller 60 are inserted into the roller entrance 34 upon actuation of release lever 62 (see FIG. 2) which makes roller holder 56 swing about swinging shaft 54. The image receiving tape 20 when located in the roller entrance 34 is superposed on the ink ribbon 26. The image receiving tape 20 and the ink ribbon 26 are pressed together between the movable platen roller 58 and the heat-generating elements 49 of the thermal head 48. Downstream of the release lever 62, the image receiving tape 20 (which at this time contains printed characters) is superposed on and adhered to the dual sided adhesive tape 24 between the driven feed roller 60 and the tape feeding roller 36.

A cutting lever 64 and a rotating cutter 66 which rotates in synchronization with movement of the cutting lever 64 are provided in main body 2 on the downstream side of the driven feed roller 60.

For additional details on the construction of the above-described recording device 1 and the ribbon cassette 16, see the above-incorporated U.S. Pat. No. 4,927,278.

A ribbon cassette 70 for producing lettering transfer tape 76 by printing letters on a second type of image receiving tape 72 (also referred to as a lettering printing tape) can be placed in the recording device 1 having the above-described construction.

FIG. 4 shows an internal arrangement of the main body 2 in which the ribbon cassette 70 for producing lettering transfer tape 76 is installed. The ribbon cassette 70 for producing lettering transfer tape 76 is different from the ribbon cassette 16 for producing label tapes 42 in that: a) a second type of image receiving tape 72 (the lettering printing tape) is wound on the printing tape spool 18; b) a lettering-type of ink ribbon 74 is wound on the ribbon supplying spool 28 with the ink containing side facing inwardly; and c) the dual sided adhesive tape 24 and the dual sided adhesive tape spool 22 are not provided.

The lettering printing tape 72 is fed from the printing tape spool 18 into the roller entrance 34 around the guide pin 32, and further is passed through the slit in tape retainer 23 from the tape feeding roller 36 in the same way that the first type of image receiving tape 20 is fed in FIG. 3. The characters are printed on the lettering printing tape 72 by the thermal head 48, to produce lettering transfer tape 76. The lettering transfer tape 76 is then discharged from the printing device 1. The lettering type of ink ribbon 74 passes between the lettering printing tape 72 and the guide pin 32 from the ribbon supplying spool 28, and moves toward the roller entrance 34 while being closely held against the lettering printing tape 72. The lettering type of ribbon 74 is then fed in the opposite direction through the peeling plate 40 toward the ribbon winding spool 30. Since the remaining elements of lettering cassette 70 are the same as ribbon cassette 16, further explanation is not necessary.

The lettering transfer tape 76 made in the printing device 1 in which the ribbon cassette 70 is installed is placed on a surface to be transcribed, such as a sheet or a file, with the letter containing side facing down. The lettering transfer tape 76 is then rubbed against the surface to be transcribed with a pointed head portion 82 of a lettering pen 80 shown in FIGS. 5A and 5B, so that the characters printed on the lettering transfer tape 76 are transcribed onto the surface. The lettering pen 80 is a thin member and is formed so that its width is smaller adjacent to the tip 82.

Prior to removing the releasable sheet, characters are printed on the image receiving tape 20 as follows. After an operator places the ribbon cassette 16 in the recording device 1, the operator operates the dial 4 and the function keys 10 in order to input desired characters, and then actuates a print key 8. Then, the printing device 1 controls the thermal head 48 based on the data concerning the inputted characters while feeding the image receiving tape 20 and the ink ribbon 26 at a predetermined speed so that the heat-generating elements 49 in the thermal head 48 are selectively actuated. Accordingly, the input characters are printed on the image receiving tape 20. After printing, the dual sided adhesive tape 24 is adhered to the printed side of the image receiving tape 20, and discharged from the printing device 1 as a label 42. The operator can cut the discharged label 42 by moving the cutting lever 64. When the operator pulls the cutting lever 64 in the direction of arrow 400 shown in FIG. 3 (counterclockwise), cutter 66 rotates in the direction of arrow 410 (clockwise) and cuts entirely through label 42.

One embodiment of the present method for removing (peeling) the releasable sheet 25 from the label 42 will be explained with reference to FIGS. 5A-B and 6A-D. It should be noted that dual sided adhesive tape 24 is not shown in FIGS. 6A-D. However, it is understood that dual sided adhesive tape is located between image receiving tape 20 and releasable sheet 25.

According to a first embodiment of the present invention, a long slot 84 is formed at the wider end of the lettering pen 80. A label 42 made in the printing device 1 (using ribbon cassette 16) can be inserted into the long slot 84. The width of the long slot 84 is greater than the thickness of the label 42 so that label 42 can be placed easily in slot 84. The portions 80a and 80b of lettering pen 80 on each side of the long slot 84 define a pair of members between which the label 42 is placed. When a label is placed in slot 84 (as will be described later with respect to FIGS. 6A-6D), the tape base 20 is located adjacent to a first one of the members (for example, 80a), and the release sheet 25 is located adjacent to a second one of the members (for example, 80b).

Figure 6A:
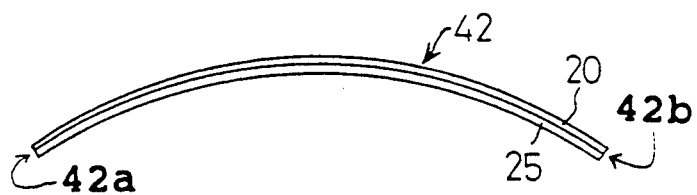
FIGS. 6A, 6B, 6C and 6D are explanatory drawings for illustrating one method of peeling a releasable sheet from a printed tape base of a label tape.

The image receiving tape 20 curves toward the releasable sheet 25 side due to the direction of winding of the image receiving tape on the printing tape spool 18 in the ribbon cassette 16 as shown in FIG. 3. This winding of tape 20 on spool 28 biases the tape so that when unwound from spool 18, it tends to bend in a preferred direction. The releasable sheet 25 is biased to curve in an opposite direction from tape 20 due to the winding direction of the releasable sheet 25 on the dual sided adhesive tape spool 22. However, since the releasable sheet 25 does not have a strong elasticity, the releasable sheet is flattened by the tape feeding roller 36 and loses much of its bias. Therefore, as shown in FIG. 6A, the image receiving tape 20 causes the label 42 to curve toward the releasable sheet 25.

Figure 6B:
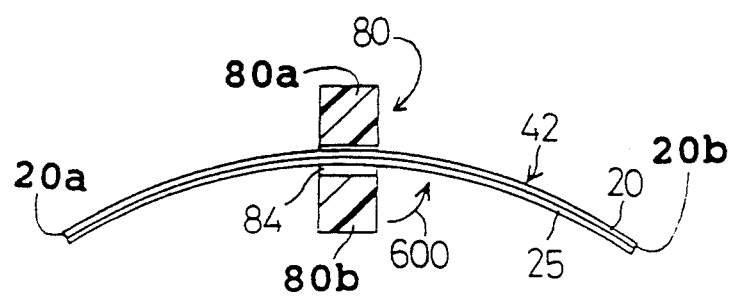
Figure 6C:
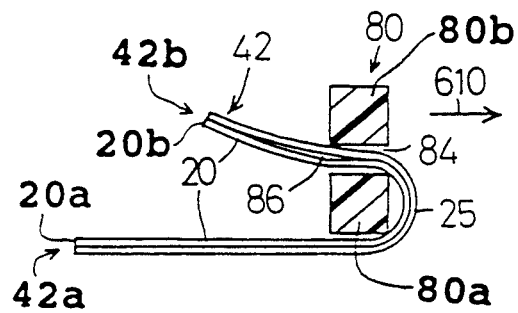

As shown in FIG. 6B, according to the first embodiment of the present invention, the label 42 is inserted through the long slot 84 of the lettering pen 80 such that the image receiving tape 20 faces upward, and is located adjacent to first member 80a. (The actual direction which tape base 20 faces does not matter.) Next, the lettering pen 80 is rotated in the direction indicated by arrow 600 (counterclockwise) about first member 80a, which is the point where the lettering pen 80 comes in contact with the image receiving tape 20. This causes label 42 to bend. When the lettering pen 80 is rotated by 180 degrees, the right portion 20b of the image receiving tape 20 faces the left portion 20a of the image receiving tape 20, with first member 80a of the lettering pen 80 therebetween. Since the label 42 curves with image receiving tape 20 on the outer side of the label 42,
the image receiving tape 20 is slightly longer than the releasable sheet 25 (see FIG. 6A). Therefore, as shown in FIG. 6C, when the label 42 is bent so that the image receiving tape 20 is located on the inside, slack is created in tape 20. The slackening of tape 20 causes a space (or gap) 86 to be formed between the image receiving tape 20 and the releasable sheet 25 to the left side of the long slot 84 as illustrated in FIG. 6C.

Figure 6D:
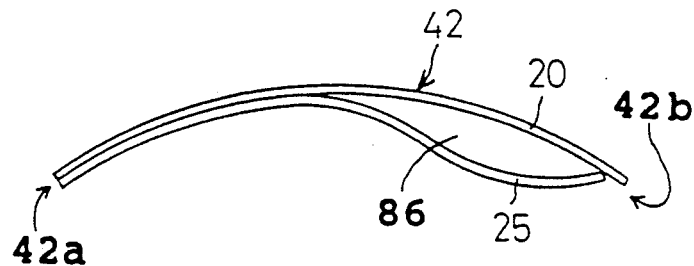

Next, the operator grasps the left end 42a of the label 42 and moves the lettering pen 80 to the right as shown by arrow 610 in FIG. 6C until label 42 is removed from the long slot 84 of the lettering pen 80. According to this operation, the space 86 moves to the right end 42b of the label 42, and the releasable sheet 25 curves in a direction opposite to the direction of curvature of tape 20 as illustrated in FIG. 6D. Since the image receiving tape 20 has a strong elasticity, the image receiving tape 20 maintains its original direction of curvature. Therefore, as shown in FIG. 6D, the releasable sheet 25 is peeled from the image receiving tape 20, from about the center portion of label 42 to the right end 42a of label 42 when the label is bent near its central portion by rotating pen 80.

As shown in FIG. 6D, if the releasable sheet 25 is peeled from the image receiving tape 20 at one end of the label 42, the operator can easily remove the releasable sheet 25 from the image receiving tape 20. The image receiving tape 20 from which the releasable sheet 25 is peeled (the image receiving tape 20 also includes the two sided adhesive tape 24, and thus forms a tape base) is then adhered to a predetermined image receiving surface as a label.

As described above, in the illustrative embodiment, the long slot 84 through which label 42 is placed is formed on one end of a lettering pen 80. After the operator inserts the label 42 through the long slot 84, the operator rotates the lettering pen 80. Then, the label 42 bends, so that the right portion 20a of the image receiving tape 20 confronts and faces the left portion 20b of the image receiving tape 20 across one member of the lettering pen 80. The operator grasps one end 42a of the label 42 and moves the lettering pen 80 away from the grasped end 42a. This pulls the label 42 out of the long slot 84 of the lettering pen 80. According to the above-mentioned simple operation, the operator can easily remove the releasable sheet 25 from the tape base formed by the image receiving tape 20 and the two sided adhesive tape 24 without folding or damaging the tape base. Moreover, a special cutting device for performing the above-described half cut is not required.

It should be understood that many changes and modifications may be made to the described embodiment without departing from the spirit and scope of the present invention. For example, in the above-mentioned embodiment, as shown in FIG. 6D, the lettering pen 80 is moved to the right direction after the label 42 is bent. However, as an alternative, the operator may grasp the left end 42a of the label 42 and pull the label 42 to the left while holding the lettering pen 80 in place. As another alternative, the operator can pull the label 42 to the left by grasping left end 42a while moving the lettering pen 80 to the right.

Additionally, pen 80 does not necessarily have to be located at the center of label 42 prior to bending the label.

Further, instead of rotating pen 80 to bend label 42, the label could be bent around pen 80 while holding pen 80 stationary. For example, after placing label 42 through slot 84 as illustrated in FIG. 6B, the operator can gently grasp left end 42a of label 42, and bend the left end 42a over first member 80a of pen 80 until the left end 42a is located such that the left portion 20a of image receiving tape 20 faces downward and confronts the left portion 20b of image receiving tape 20, with member 80a located therebetween. Such bending of label 42 results in label end 42b extending from between first and second members 80a and 80b, and label end 42a extending only adjacent to member 80a (much like FIG. 6C where label end 42a extends only adjacent to member 80b). Then, the bent label 42 is removed from slot 84 by moving label end 42a and pen 80 apart from each other so that a space forms between a portion of the releasable sheet 25 adjacent to label end 42b. Note that this movement is similar to the movement described with respect to the first embodiment in FIGS. 6A-6D, in that label end 42a (the end which extends adjacent to only one member (member 80a)) is moved apart from pen 80.

Although a lettering pen having a long slot 84 forms the first and second members 80a and 80b in the above-described embodiments, other devices can be used to form the first and second members. For example, a lettering pen 80 can be provided which can bend in half to form a pair of members. By bending the lettering pen 80, the right and left ends of the lettering pen 80 would form a pair of members for use in the method of the present invention. Any pair of members may be used in the present invention, as long as they can form an opening through which the label 42 can be inserted, and which can bend the label 42 in order to confront the image receiving tape 20 with itself.

Another aspect of the present invention involves the provision of a tape printer and the first and second members used to remove the releasable sheet 25 from a label. As shown in FIG. 7, a tape printer 1 as shown and described above with reference to FIGS. 1-4 is preferably provided in combination with a lettering pen 80 having slot 84, together in a common package 90 such as, for example, a box. The slotted lettering pen 80 would be useful with tape printer if either label producing cassette 16 or lettering transfer tape producing cassette 70 were used.

Figure 8:
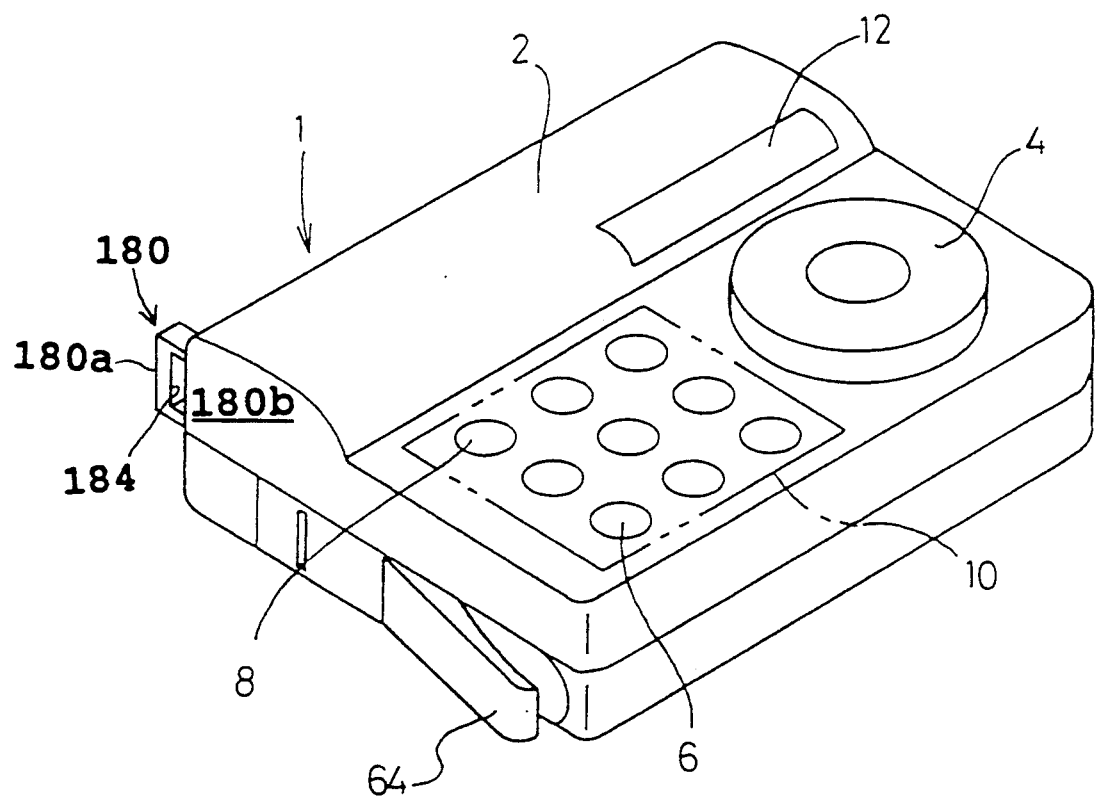
FIG. 8 is a schematic perspective view of a tape printer which includes a slot-defining element thereon.

As an alternative to the FIG. 7 embodiment, as shown in FIG. 8, a slot-defining element 180 can be provided, for example, on the main body 2 of tape printer 1. Element 180 includes first member 180a which, together with a portion 180b of main body 2 defines a slot 184. In the FIG. 8 embodiment, portion 180b of main body 2 can be used as the second member of the method described above. In order to perform the above-described method with the tape printer of FIG. 8, first a printed label 42 is inserted through slot 184 with its tape base 20 facing member 180a, and the releasable sheet 25 facing member 180b. Then, a first end of the label is bent around member 180a so that the tape base 20 confronts itself at opposite ends of the label. At this point, one end of the label will extend between members 180a and 180b, and the other label end (the end which was moved in the bending step) will extend only adjacent to member 180a. The label end which extends only adjacent to member 180a is then moved away from tape printer so that the label is removed from slot 184 to cause a portion of the releasable sheet 25 to separate from the tape base 20.

Of course, structures other than element 180 can be provided on tape printer in order to perform the method of the present invention. For example, a slotted element similar to the slotted end of pen 80 could be rotatably mounted to main housing 2 of tape printer 1 so that a label can be bent by rotating the slotted element as described above in FIGS. 6A-6D.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A method of removing a releasable sheet from an adhesive layer of a label, said label being comprised of a tape base having the adhesive layer and the releasable sheet adhered to the adhesive layer, comprising the steps of:

inserting the label into an opening formed by first and second members arranged more than a thickness of the label away from each other so that the first member is adjacent to the tape base, and the second member is adjacent to the releasable sheet;

confronting one end portion of the label with an opposite end portion of the label by rotating the second member about the first member so that the label bends; and moving one end of the label relative to the first and second members until the label is removed from the opening so that a space forms between a portion of the releasable sheet and the adhesive layer, and said space is located at one of said end portions of said label.

2. The method according to claim 1, wherein said first and second members are located on opposite sides of a slot in a lettering pen.

3. The method of claim 1, wherein said one end of the label is held stationary while said first and second members are moved away from said one end after bending said label.

4. The method of claim 1, wherein said first and second members are held stationary while said one end is moved away from said first and second members after bending said label.

5. The method of claim 1, wherein said one end and said first and second members are moved in opposite directions after bending said label.

6. The method of claim 1, wherein said tape base is biased to curve in one direction, and the steps of bending said label and removing said label from the opening causes the portion of the releasable sheet which is spaced from the tape base to be biased to curve in a direction opposite from the direction which the tape base curves.

7. The method of claim 1, further comprising:
   grasping the portion of the releasable sheet which is spaced from said adhesive layer; and
   entirely separating the releasable sheet from said tape base.

8. The method of claim 1, wherein said space is initially formed a distance away from said end portion, and said space is moved to said end portion during said moving step.

9. The method of claim 1, wherein said space is initially formed at a central portion of said label, and said space is moved to said end portion during said moving step.

10. The method of claim 1, wherein said first and second members are part of a slot-defining element provided on a main body of a tape printer.

11. A method of removing a releasable sheet from an adhesive layer of a label, said label being comprised of a tape base having the adhesive layer on one side of said tape base and the releasable sheet adhered to the adhesive layer, comprising the steps of:

inserting the label between first and second members so that the first member is adjacent to the tape base and the second member is adjacent to the releasable sheet;

bending the label around said first member so that the tape base confronts itself with the first and second opposite end portions of said label pointing in a same direction, wherein said first label end portion extends from between said first and second members, and said second label end portion extends only adjacent to said first member; and moving said second label end portion relative to the first and second members until the label is removed from between said first and second members so that a space forms between said releasable sheet and said adhesive layer, and said space is located at said first label end portion of said label.

12. The method of claim 11, wherein the step of bending said label around said first member includes rotating said second member about said first member to bend said label.

13. The method of claim 11, wherein said label is inserted between said first and second members until said first and second members are located adjacent to a central portion of said label, whereby bending said label causes said label to be U-shaped.

14. The method of claim 11, wherein said first and second members are located on opposite sides of a slot in a lettering pen, said slot having a width greater than a thickness of said label.

15. The method of claim 11, wherein said tape base is biased to curve in one direction, and the steps of bending said label and removing said label from the opening causes the portion of the releasable sheet which is spaced from the tape base to be biased to curve in a direction opposite from the direction which the tape base curves.

16. The method of claim 11, wherein said space is initially formed a distance away from said first label end portion, and said space is moved to said first label end portion during said moving step.

17. The method of claim 11, wherein said space is initially formed at a central portion of said label, and said space is moved to said first label end portion during said moving step.

18. The method of claim 11, wherein said first and second members are part of a slot-defining element provided on a main body of a tape printer.

* * * * *